US011284346B2

United States Patent
Xu et al.

(10) Patent No.: US 11,284,346 B2
(45) Date of Patent: Mar. 22, 2022

(54) DATA TRANSMISSION METHOD AND APPARATUS

(71) Applicant: Huawei Technologies Co., Ltd., Shenzhen (CN)

(72) Inventors: Xiaoying Xu, Shanghai (CN); Qinghai Zeng, Shanghai (CN); Qufang Huang, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 16/503,124

(22) Filed: Jul. 3, 2019

(65) Prior Publication Data

US 2019/0327680 A1 Oct. 24, 2019

Related U.S. Application Data

(63) Continuation of application No. PCT/CN2017/112527, filed on Nov. 23, 2017.

(30) Foreign Application Priority Data

Jan. 5, 2017 (CN) .......................... 201710008537.6

(51) Int. Cl.
*H04W 52/02* (2009.01)
*H04W 76/11* (2018.01)
(Continued)

(52) U.S. Cl.
CPC ....... *H04W 52/0229* (2013.01); *H04L 1/0003* (2013.01); *H04L 1/1819* (2013.01);
(Continued)

(58) Field of Classification Search
CPC ... H04W 52/365; H04W 80/02; H04W 76/00; H04W 76/11; H04W 28/0278;
(Continued)

(56) References Cited

U.S. PATENT DOCUMENTS

2004/0203783 A1* 10/2004 Wu ..................... H04W 12/062
455/436
2014/0010207 A1 1/2014 Horn et al.
(Continued)

FOREIGN PATENT DOCUMENTS

CN 104620666 A 5/2015
CN 105591721 A 5/2016
(Continued)

OTHER PUBLICATIONS

Catt, "Small data transmission in inactive state", 3GPP TSG-RAN WG2 Meeting #95bis, R2-166118, Kaohsiung, Oct. 10-14, 2016, 4 pages.
(Continued)

*Primary Examiner* — Rownak Islam
(74) *Attorney, Agent, or Firm* — Slater Matsil, LLP

(57) ABSTRACT

Embodiments of this application provide a data transmission method and apparatus. The method includes: receiving data sent by a terminal in an inactive state, where the data includes to-be-sent data sent by the terminal and identification information of the terminal; determining an anchor base station of the terminal based on the identification information; and sending the data to the anchor base station, so that the anchor base station sends the data to a core-network device. The uplink data of the terminal is forwarded to the anchor base station by using a serving base station and through an interaction between the anchor base station and the serving base station that currently provides an air interface resource for the terminal, and is then transmitted to a core network.

20 Claims, 7 Drawing Sheets

(51) Int. Cl.
  *H04L 1/00* (2006.01)
  *H04L 1/18* (2006.01)
  *H04L 5/00* (2006.01)
  *H04L 27/26* (2006.01)
  *H04W 28/02* (2009.01)
  *H04W 52/36* (2009.01)
  *H04W 80/02* (2009.01)

(52) U.S. Cl.
  CPC ........ *H04L 5/0082* (2013.01); *H04L 27/2607* (2013.01); *H04W 28/0278* (2013.01); *H04W 52/365* (2013.01); *H04W 76/11* (2018.02); *H04W 80/02* (2013.01)

(58) Field of Classification Search
  CPC .............. H04W 52/02; H04W 52/0229; H04L 1/0003; H04L 1/1819; H04L 27/2607; H04L 5/0082
  USPC .......................................................... 370/329
  See application file for complete search history.

(56) References Cited

U.S. PATENT DOCUMENTS

| | | | | |
|---|---|---|---|---|
| 2015/0341960 | A1* | 11/2015 | Quan | H04L 1/189 370/329 |
| 2017/0215117 | A1* | 7/2017 | Kwon | H04B 7/0408 |
| 2017/0230086 | A1 | 8/2017 | Chen et al. | |
| 2017/0318606 | A1* | 11/2017 | Lee | H04W 74/004 |
| 2018/0199251 | A1* | 7/2018 | Kim | H04W 74/0833 |
| 2019/0281441 | A1* | 9/2019 | Huang | H04W 72/042 |

FOREIGN PATENT DOCUMENTS

| | | |
|---|---|---|
| CN | 105979592 A | 9/2016 |
| RU | 2012103239 A | 8/2013 |
| WO | 2014008380 A1 | 1/2014 |
| WO | 2015041408 A1 | 3/2015 |
| WO | 2016061789 A1 | 4/2016 |

OTHER PUBLICATIONS

Fujitsu,"RAN based area and RAN initiated notification in inactive state",3GPP TSG-RAN WG2 Meeting #96 R2-168233,Reno, USA, Nov. 14-18, 2016,total 3 pages.

Nokia, et al., "Data transmission in INACTIVE", 3GPP DRAFT RAN WG2, R2-167706, Reno, USA; Nov. 14-18, 2016, XP051177524, 8 pages.

Catt, "Support Data Transmission in Inactive State", 3GPP DRAFT RAN WG2, R2-164807, Gothenburg, Sweden, Aug. 22-26, 2016, XP051126516, 10 pages.

Interdigital Communications, "Control Plane and Connectivity Principles for NR", 3GPP TSG-RAN WG2 #94, R2-164160, Nanjing, China, May 23-27, 2016, 5 pages.

Samsung, "Analysis of the signalling load for a new RRC state", 3GPP TSG-RAN WG2 Meeting #95bis, R2-166061, Kaohsiung, Taiwan, Oct. 10-14, 2016, 9 pages.

Ericsson, "Small data transmission for inactive Ues," 3GPP TSG-RAN WG2 #95bis, R2-166922, Kaohsiung, Taiwan, Oct. 10-14, 2016, 7 pages.

SA3, "Reply LS to R3-162642 on Light Connection," 3GPP TSG-SA WG3 Meeting #85, S3-161657, Santa Cruz de Tenerife, Spain, Nov. 7-11, 2016, 2 pages.

\* cited by examiner

DATA TRANSMISSION METHOD AND APPARATUS

CROSS-REFERENCE TO RELATED APPLICATIONS

This application is a continuation of International Application No. PCT/CN2017/112527, filed on Nov. 23, 2017, which claims priority to Chinese Patent Application No. 201710008537.6, filed on Jan. 5, 2017. The disclosures of the aforementioned applications are hereby incorporated by reference in their entireties.

TECHNICAL FIELD

Embodiments of this application relate to communications technologies, and in particular, to a data transmission method and apparatus.

BACKGROUND

With development of network technologies and popularization of mobile terminal devices, scenarios in which users send or receive data by using mobile terminal devices become more common. A device such as a mobile phone remains in a network-connected state even if no data needs to be sent or received. To save network resources, a concept of a light connected state/an inactive state is proposed. The light connected state is used in a long term evolution (LTE) network. A state referred to as the inactive state is introduced in a new (RAT) such as 5G. Behavior in the state is similar to that in the light connected state in LTE, and is merely to retain a connection that is between a core-network node and an access network and that serves UE.

FIG. 1 is a schematic diagram of a tracking area update of UE data. As shown in FIG. 1, an interface that is between a CN and a radio access network (RAN) and that serves a terminal (UE) in "a light connected state/an inactive state" is anchored to a RAN node (for example, an anchor base station eNB 1, that is, a base station to which the UE is connected during movement to transmit data). The UE does not need to notify the base station when the UE moves within a predefined area (referred to as a notification area in 5G and referred to as a paging area in LTE, that is, a tracking area of the eNB 1 in FIG. 1). However, once the UE is out of the area and moves into a tracking area of an eNB 3, the UE needs to notify the base station eNB 3 of a location of the UE, that is, perform a tracking area update process. When the UE in the "light connected state/inactive state" moves to another base station and needs to send data, the UE initiates a connection recovery process to a serving base station, and enters an active state. The serving base station is a base station to which a cell providing an air interface resource for the UE belongs. The serving base station initiates a context request for the UE to the anchor base station, to migrate a context of the UE to the serving base station eNB 3 to which the UE belongs; at the same time, a path switching request is sent to a core-network node, to switch a connection path S1 corresponding to the UE to the serving base station. Only then can data transmission of the UE be implemented.

However, in the foregoing manner, each time a serving base station of the UE changes, context migration and switching of a connection between a core network and a base station need to be performed and an anchor base station needs to be changed. Change of the anchor base station results in a UE key update and context obtaining. This causes relatively high signaling overheads during movement of the UE. When the UE moves between two base stations, the context of the UE is frequently migrated between the two base stations, and interface overheads between the base stations and the core network and air-interface radio resource control (RRC) signaling overheads are high.

SUMMARY

Embodiments of this application provide a data transmission method and apparatus, so as to resolve the following problem: Relatively high signaling overheads are caused during movement of a terminal, and when the terminal moves between two base stations, a context of the terminal is frequently migrated between the two base stations, and interface overheads between the base stations and a core network and air-interface RRC signaling overheads are high.

According to a first aspect of the embodiments of this application, a data transmission method is provided. The method includes receiving, by a serving base station, data sent by a terminal in an inactive state, where the data includes to-be-sent data sent by the terminal and identification information of the terminal. The method also includes determining, by the serving base station, an anchor base station of the terminal based on the identification information. The method also includes sending, by the serving base station, the data to the anchor base station.

This solution is performed by the serving base station. Uplink data of the terminal is forwarded to the anchor base station by using the serving base station and through an interaction between the anchor base station and the serving base station that currently provides an air interface resource for the terminal. The anchor base station sends the data to a core-network device. Neither context migration nor switching between a core network and a base station needs to be performed. Therefore, signaling and interface overheads are reduced, and data transmission efficiency is improved.

In a specific implementation, the method further includes: receiving a logical channel identifier corresponding to the data sent by the terminal; and sending, to the anchor base station, an IP flow identifier and/or a logical channel identifier and/or a channel type corresponding to the to-be-sent data, where the logical channel identifier is included in the data or not included in the data.

In a specific implementation, the identification information includes: a unique identifier used to indicate the terminal in an access-network notification area in which the terminal is located; or a cell radio network temporary identifier (C-RNTI); or an identifier allocated by a core-network device.

In the foregoing solution, the identification information may further include information indicating the anchor base station to which the terminal belongs, that is, the identification information of the terminal may be configured identification information specially used to identify the anchor base station of the terminal, or may be the C-RNTI.

Based on the foregoing solution, before the receiving data sent by a terminal, the method further includes: broadcasting configuration information, where the configuration information includes at least one of feedback or retransmission configuration information, physical layer parameter configuration information, non-scheduled transmission configuration information, MAC layer control information, and channel configuration information.

The feedback or retransmission configuration information includes at least one of the following: a hybrid automatic repeat request (HARQ) process number, a retransmission redundancy version, an indication about whether to reset media access control (MAC), a physical downlink control channel (PDCCH) time-frequency resource used for feedback or downlink data sending, a timing relationship from uplink sending to downlink feedback, and a timing relationship from downlink sending to uplink feedback.

The physical layer parameter configuration information includes at least one of the following: transmission time interval (TTI) duration, a cyclic prefix (CP) length, a subcarrier spacing, and a physical channel type.

The non-scheduled transmission configuration information includes at least one of the following: a quantity of times of non-scheduled uplink blind retransmission, a non-scheduled automatic retransmission interval, non-scheduled transmission signal received power expected by a base station, a non-scheduled transmission power boost step, a demodulation reference signal DRMS list available for non-scheduled transmission, and a modulation and coding scheme (MCS) available for non-scheduled transmission.

The MAC layer control information includes at least one of the following: whether to report channel state information (CSI), periodic or aperiodic CSI reporting, a CSI reporting class, whether to report a power headroom report (PHR), periodic or aperiodic PHR reporting, whether to report a buffer status report (BSR), a BSR reporting format, and periodic or aperiodic BSR reporting.

The channel configuration information includes at least one of the following: a radio link control (RLC) configuration corresponding to a service channel, a correspondence between a service channel and a flow identifier, and an RLC configuration corresponding to a control channel.

In the foregoing solution, when an RLC layer is maintained by the anchor base station, the configuration information does not include the channel configuration information.

In a specific implementation, the data sent by the serving base station to the anchor base station is RLC data or MAC data.

A meaning of this solution is as follows: The serving base station may be responsible for maintaining a physical layer, a MAC layer, and the RLC layer, and the anchor base station maintains a packet data convergence protocol (PDCP) layer; in this case, the data sent by the serving base station to the anchor base station is the RLC data. Alternatively, the serving base station may be responsible for maintaining a physical layer and a MAC layer, and the anchor base station maintains the RLC layer and a PDCP layer; in this case, the data sent by the serving base station to the anchor base station is the MAC data.

In a specific implementation, the data further includes key update indication information sent by the terminal, where the key update indication information may include a simple key change indication or a specific key deduction parameter.

In this solution, if a key previously used by the terminal needs to be changed, the serving base station and the anchor base station need to obtain a deduction parameter used by the terminal to change the key. A specific manner may be as follows: The terminal sends the deduction parameter, or the deduction parameter is obtained based on preconfigured information, or the anchor base station or the serving base station sends the deduction parameter to the terminal.

In a specific implementation, the method further includes: allocating new terminal identification information to the terminal; and sending the new terminal identification information to the terminal, and/or sending the new terminal identification information to the anchor base station.

In a specific implementation, the method further includes: starting a timer after the data is received, and deleting the identification information of the terminal after the timer expires.

In a specific implementation, the method further includes: sending a terminal identity deletion instruction to the anchor base station, to instruct the anchor base station to delete the identification information of the terminal.

In the foregoing solution, the serving base station may allocate the new terminal identification information to the terminal or delete the identification information of the terminal. In both of the processes, the anchor base station needs to be instructed to perform a corresponding update.

In a specific implementation, the method further includes: establishing a MAC entity or an RLC entity corresponding to the terminal; or receiving configuration information and/or state information, sent by the anchor base station, of an RLC entity corresponding to the terminal.

In this solution, the MAC entity or the RLC entity corresponding to the terminal is usually established after a conflict is resolved, or after the anchor base station successfully receives the data, or after the uplink data of the terminal is successfully sent and an acknowledgement message is returned to the terminal.

According to a second aspect of the embodiments of this application, a data transmission method is provided. The method includes: obtaining, by a terminal in an inactive state, configuration information used for data sending. The method also includes sending, by the terminal, data to a serving base station based on the configuration information, where the data includes to-be-sent data and identification information of the terminal.

This solution is performed by the terminal. When the terminal needs to send uplink data, the terminal sends the to-be-sent data together with the identification information of the terminal to the serving base station based on preconfigured configuration information or received configuration information broadcast by the serving base station, and sends the data to an anchor base station of the terminal by using the serving base station, so as to implement uplink data transmission. Neither context migration nor switching of a link between a core network and a base station needs to be performed. Therefore, interface resources are saved, and transmission efficiency is improved.

In a specific implementation, the method further includes the following implementations.

In an implementation, when the terminal enters the inactive state from an active state, a PDCP entity and an RLC entity of each logical channel are stored, and a MAC entity and/or a physical channel configuration are/is reset; or when the terminal enters the inactive state from an active state, a packet data convergence protocol PDCP entity is stored or configured, and an RLC entity and/or a MAC entity and/or a physical channel configuration are/is reset.

Specifically, state information and configuration information of PDCP and RLC are stored.

In an implementation, when the terminal enters the inactive state from an active state, security contexts such as an SN number, an HFN, and a key of PDCP are stored, and an RLC entity and/or a MAC entity and/or a physical channel configuration are/is reset. In a specific implementation, a PDCP entity corresponding to the broadcast logical channel is configured.

In a specific implementation, the identification information of the terminal includes: a unique identifier used to indicate the terminal in an access-network notification area in which the terminal is located; or a C-RNTI; or an identifier allocated by a core-network device.

In this solution, the identification information may further include information used to indicate the anchor base station to which the terminal belongs.

In a specific implementation, the obtaining configuration information used for data sending includes: obtaining the configuration information preconfigured in a protocol; or receiving the configuration information broadcast by the serving base station or sent by the anchor base station, where the configuration information includes at least one of feedback or retransmission configuration information, physical layer parameter configuration information, non-scheduled transmission configuration information, MAC layer control information, and channel configuration information.

The feedback or retransmission configuration information includes at least one of the following: a HARQ process number, a retransmission redundancy version, an indication about whether to reset MAC, a PDCCH time-frequency resource used for feedback or downlink data sending, a timing relationship from uplink sending to downlink feedback, and a timing relationship from downlink sending to uplink feedback.

The physical layer parameter configuration information includes at least one of the following: TTI duration, a CP length, a subcarrier spacing, and a physical channel type.

The non-scheduled transmission configuration information includes at least one of the following: a quantity of times of non-scheduled uplink blind retransmission, a non-scheduled automatic retransmission interval, non-scheduled transmission signal received power expected by a base station, a non-scheduled transmission power boost step, a DRMS list available for non-scheduled transmission, and an MCS available for non-scheduled transmission.

The MAC layer control information includes at least one of the following: whether to report CSI, periodic or aperiodic CSI reporting, a CSI reporting class, whether to report a PHR, periodic or aperiodic PHR reporting, whether to report a BSR, a BSR reporting format, and periodic or aperiodic BSR reporting.

The channel configuration information includes at least one of the following: an RLC configuration corresponding to a service channel, a correspondence between a service channel and a flow identifier, and an RLC configuration corresponding to a control channel.

In a specific implementation, before the sending data to a serving base station based on the configuration information, the method further includes: obtaining the to-be-sent data; and performing encryption and/or integrity protection on the to-be-sent data by using a pre-obtained key or a key currently obtained through calculation.

In a specific implementation, before the obtaining the to-be-sent data, the method further includes: receiving indication information sent by the anchor base station, where the indication information is used to indicate whether the terminal needs to update a key; and if the indication information indicates that the terminal does not need to change the key, determining that the key obtained last time can still be used.

In a specific implementation of this solution, the method further includes: if the indication information indicates that the terminal needs to update the key, obtaining a new key by performing deduction by using a deduction parameter received last time; and sending key update indication information to the serving base station, where the key update indication information may include the deduction parameter.

In another specific implementation, the method further includes: obtaining new terminal identification information allocated by the serving base station.

According to a third aspect of the embodiments of this application, a data transmission method is provided. The method includes receiving, by an anchor base station, data sent by a serving base station, where the data includes to-be-sent data sent by a terminal and identification information of the terminal. The method also includes obtaining, by the anchor base station based on the identification information of the terminal, link information corresponding to the terminal. The method also includes sending, by the anchor base station, the data to a core-network device based on the link information.

This solution is performed by the anchor base station of the terminal, that is, a base station to which the terminal is connected last time for data transmission. Uplink data of the terminal is forwarded to the anchor base station by using the serving base station and through an interaction between the anchor base station and the serving base station that currently provides an air interface resource for the terminal, and is then transmitted to a core network. Neither context migration nor switching between the core network and a base station needs to be performed. Therefore, signaling and interface overheads are reduced, and data transmission efficiency is improved.

In a specific implementation, the method further includes: receiving an IP flow identifier and/or a logical channel identifier and/or a channel type that are/is corresponding to the to-be-sent data and that are/is sent by the serving base station, where the logical channel identifier is included in the data or not included in the data.

In a specific implementation, the method further includes: receiving new terminal identification information of the terminal that is sent by the serving base station.

In a specific implementation, the method further includes: receiving a terminal identity deletion instruction sent by the serving base station; and deleting the identification information of the terminal according to the terminal identity deletion instruction.

In a specific implementation, the method further includes: sending, to the serving base station, configuration information and/or state information of an RLC entity corresponding to the terminal.

According to a fourth aspect of the embodiments of this application, a data transmission method is provided. The method includes receiving, by a serving base station, data sent by an anchor base station, where the data includes to-be-sent data that is to be sent to a terminal and identification information of the terminal. The method also includes sending, by the serving base station, the to-be-sent data to the terminal.

In a specific implementation, the identification information includes: information about a unique identifier used to indicate the terminal in an access-network notification area in which the terminal is located, or a C-RNTI allocated to the terminal, or an identifier allocated by a core-network device to the terminal.

This solution is performed by the serving base station. Downlink data transmission of the terminal is implemented through an interaction between the serving base station and the anchor base station. The serving base station does not need to establish a link to the core-network device, but directly receives, by using the anchor base station, downlink data that is sent by the core-network device by using the anchor base station, and forwards the downlink data to the terminal based on the identification information of the terminal. Therefore, interface resources are saved, and signaling overheads are reduced.

According to a fifth aspect of the embodiments of this application, a data transmission method is provided. The method includes receiving, by an anchor base station, data sent by a core-network device, where the data includes to-be-sent data that is to be sent to a terminal and identification information of the terminal. The method also includes determining, by the anchor base station, a serving base station of the terminal based on the identification information of the terminal. The method also includes sending, by the anchor base station, the data to the serving base station.

In a specific implementation, the identification information includes: information about a unique identifier used to indicate the terminal in an access-network notification area in which the terminal is located, or a C-RNTI allocated to the terminal.

This solution is performed by the anchor base station. The anchor base station directly forwards, to the serving base station, downlink data sent by a core network, so that the serving base station forwards the downlink data to the terminal. In this process, neither context migration nor switching of a link between the core network and a base station needs to be performed. Therefore, interface resources are saved, and signaling overheads are reduced.

According to a sixth aspect of the embodiments of this application, a data transmission apparatus is provided. The apparatus includes a receiving module, configured to receive data sent by a terminal in an inactive state, where the data includes to-be-sent data sent by the terminal and identification information of the terminal. The apparatus also includes a processing module, configured to determine an anchor base station of the terminal based on the identification information. The apparatus also includes a sending module, configured to send the data to the anchor base station.

In a specific implementation, the receiving module is further configured to receive a logical channel identifier corresponding to the data sent by the terminal; and the sending module is further configured to send, to the anchor base station, an IP flow identifier and/or a logical channel identifier and/or a channel type corresponding to the to-be-sent data, where the logical channel identifier is included in the data or not included in the data.

In a specific implementation, the identification information received by the receiving module includes: a unique identifier used to indicate the terminal in an access-network notification area in which the terminal is located; or a C-RNTI; or an identifier allocated by a core-network device.

In a specific implementation, the sending module is further configured to broadcast configuration information: at least one of feedback or retransmission configuration information, physical layer parameter configuration information, non-scheduled transmission configuration information, MAC layer control information, and channel configuration information.

The feedback or retransmission configuration information includes at least one of the following: a HARQ process number, a retransmission redundancy version, an indication about whether to reset MAC, a PDCCH time-frequency resource used for feedback or downlink data sending, a timing relationship from uplink sending to downlink feedback, and a timing relationship from downlink sending to uplink feedback.

The physical layer parameter configuration information includes at least one of the following: TTI duration, a CP length, a subcarrier spacing, and a physical channel type.

The non-scheduled transmission configuration information includes at least one of the following: a quantity of times of non-scheduled uplink blind retransmission, a non-scheduled automatic retransmission interval, non-scheduled transmission signal received power expected by a base station, a non-scheduled transmission power boost step, a DRMS list available for non-scheduled transmission, and an MCS available for non-scheduled transmission.

The MAC layer control information includes at least one of the following: whether to report CSI, periodic or aperiodic CSI reporting, a CSI reporting class, whether to report a PHR, periodic or aperiodic PHR reporting, whether to report a BSR, a BSR reporting format, and periodic or aperiodic BSR reporting.

The channel configuration information includes at least one of the following: an RLC configuration corresponding to a service channel, a correspondence between a service channel and a flow identifier, and an RLC configuration corresponding to a control channel.

In a specific implementation, the to-be-sent data received by the receiving module is RLC data or MAC data.

In a specific implementation, the data further includes key update indication information sent by the terminal. The key update indication information in this solution may include a deduction parameter.

In a specific implementation, the processing module is further configured to allocate new terminal identification information to the terminal; and the sending module is further configured to send the new terminal identification information to the terminal, and/or send the new terminal identification information to the anchor base station.

In a specific implementation, the processing module is further configured to start a timer after the data is received, and delete the identification information of the terminal after the timer expires.

In a specific implementation, the sending module is further configured to send a terminal identity deletion instruction to the anchor base station, to instruct the anchor base station to delete the identification information of the terminal.

In a specific implementation, the processing module is further configured to establish a MAC entity or an RLC entity corresponding to the terminal; or the receiving module is further configured to receive configuration information and/or state information, sent by the anchor base station, of an RLC entity corresponding to the terminal.

According to a seventh aspect of the embodiments of this application, a data transmission apparatus is provided. The apparatus includes a processing module, configured to obtain configuration information used for data sending. The apparatus also includes a sending module, configured to send data to a serving base station based on the configuration information, where the data includes to-be-sent data and identification information.

In a specific implementation, the processing module is specifically configured to: when the apparatus enters an inactive state from an active state, store a PDCP entity and an RLC entity of each logical channel, and reset a MAC entity and/or a physical channel configuration; or when the apparatus enters an inactive state from an active state, store or configure a PDCP entity, and reset an RLC entity and/or a MAC entity and/or a physical channel configuration.

In a specific implementation, the identification information of the terminal includes: a unique identifier used to indicate the terminal in an access-network notification area in which the terminal is located; or a C-RNTI; or an identifier allocated by a core-network device.

In a specific implementation, the processing module is further configured to obtain the configuration information preconfigured in a protocol; or the receiving module is further configured to receive the configuration information broadcast by the serving base station or sent by an anchor base station, where the configuration information includes at least one of feedback or retransmission configuration information, physical layer parameter configuration information, non-scheduled transmission configuration information, MAC layer control information, and channel configuration information.

The feedback or retransmission configuration information includes at least one of the following: a HARQ process number, a retransmission redundancy version, an indication about whether to reset MAC, a PDCCH time-frequency resource used for feedback or downlink data sending, a timing relationship from uplink sending to downlink feedback, and a timing relationship from downlink sending to uplink feedback.

The physical layer parameter configuration information includes at least one of the following: transmission time interval TTI duration, a cyclic prefix CP length, a subcarrier spacing, and a physical channel type.

The non-scheduled transmission configuration information includes at least one of the following: a quantity of times of non-scheduled uplink blind retransmission, a non-scheduled automatic retransmission interval, non-scheduled transmission signal received power expected by a base station, a non-scheduled transmission power boost step, a DRMS list available for non-scheduled transmission, and an MCS available for non-scheduled transmission.

The MAC layer control information includes at least one of the following: whether to report CSI, periodic or aperiodic CSI reporting, a CSI reporting class, whether to report a PHR, periodic or aperiodic PHR reporting, whether to report a BSR, a BSR reporting format, and periodic or aperiodic BSR reporting.

The channel configuration information includes at least one of the following: an RLC configuration corresponding to a service channel, a correspondence between a service channel and a flow identifier, and an RLC configuration corresponding to a control channel.

In a specific implementation, before the data is sent to the serving base station based on the configuration information, the processing module is further configured to: obtain the to-be-sent data; and perform encryption and/or integrity protection on the to-be-sent data by using a pre-obtained key or a key currently obtained through calculation.

In a specific implementation, before the to-be-sent data is obtained, the receiving module is further configured to receive indication information sent by the anchor base station, where the indication information is used to indicate whether the terminal needs to update a key; and if the indication information indicates that the terminal does not need to change the key, the processing module determines that the key obtained last time can still be used.

In a specific implementation, if the indication information indicates that the terminal needs to update the key, the processing module is further configured to obtain a new key by performing deduction by using a deduction parameter received last time; and the sending module is further configured to send key update indication information to the serving base station, where the key update indication information may include the deduction parameter.

In a specific implementation, the processing module is further configured to obtain new terminal identification information allocated by the serving base station.

According to an eighth aspect of the embodiments of this application, a data transmission apparatus is provided. The apparatus includes a receiving module, configured to receive data sent by a serving base station, where the data includes to-be-sent data sent by a terminal and identification information of the terminal. The apparatus also includes a processing module, configured to obtain, based on the identification information of the terminal, link information corresponding to the terminal; and a sending module, configured to send the data to a core-network device based on the link information.

In a specific implementation, the receiving module is further configured to receive an IP flow identifier and/or a logical channel identifier and/or a channel type that are/is corresponding to the to-be-sent data and that are/is sent by the serving base station, where the logical channel identifier is included in the data or not included in the data.

In a specific implementation, the receiving module is further configured to receive new terminal identification information of the terminal that is sent by the serving base station.

In a specific implementation, the receiving module is further configured to receive a terminal identity deletion instruction sent by the serving base station; and the processing module is further configured to delete the identification information of the terminal according to the terminal identity deletion instruction.

In a specific implementation, the sending module is further configured to send, to the serving base station, configuration information and/or state information of an RLC entity corresponding to the terminal.

According to a ninth aspect of the embodiments of this application, a data transmission apparatus is provided. The apparatus includes a receiving module, configured to receive data sent by an anchor base station, where the data includes to-be-sent data that is to be sent to a terminal and identification information of the terminal. The apparatus also includes a sending module, configured to send the to-be-sent data to the terminal based on the identification information of the terminal.

According to a tenth aspect of the embodiments of this application, a data transmission apparatus is provided. The apparatus includes a receiving module, configured to receive data sent by a core-network device, where the data includes to-be-sent data that is to be sent to a terminal and identification information of the terminal. The apparatus also includes a processing module, configured to determine a serving base station of the terminal based on the identification information of the terminal. The apparatus also includes a sending module, configured to send the data to the serving base station.

According to an eleventh aspect of the embodiments of this application, a base station is provided. The base station provides an air interface for a terminal, and the base station may interact with another base station. The base station includes at least one processor, a memory, and a communications interface (for example, a receiver and a transmitter). The at least one processor, the memory, and the communications interface are connected to each other by using a bus. The memory stores a computer executable instruction. The at least one processor executes the computer executable instruction stored in the memory, so that the base station performs the data transmission method according to any one of the first aspect or the implementations of the first aspect or any one of the fifth aspect or the implementations of the fifth aspect by exchanging data with another base station and a terminal through the communications interface.

According to a twelfth aspect of the embodiments of this application, a terminal is provided. The terminal includes at least one processor, a memory, and a communications interface (for example, the terminal transmits data by using a receiver and a transmitter). The at least one processor, the memory, and the communications interface are connected to each other by using a bus. The memory stores a computer executable instruction. The at least one processor executes the computer executable instruction stored in the memory, so that the terminal performs the data transmission method according to any one of the second aspect or the implementations of the second aspect by exchanging data with a serving base station or an anchor base station through the communications interface.

According to a thirteenth aspect of the embodiments of this application, a base station is provided. The base station may interact with another base station, and includes at least one processor, a memory, and a communications interface (for example, the base station transmits data by using a receiver and a transmitter). The at least one processor, the memory, and the communications interface are connected to each other by using a bus. The memory stores a computer executable instruction. The at least one processor executes the computer executable instruction stored in the memory, so that the base station performs the data transmission method according to any one of the third aspect or the implementations of the third aspect or any one of the fourth aspect or the implementations of the fourth aspect by exchanging data with another base station or a terminal through the communications interface.

According to a fourteenth aspect of the embodiments of this application, a computer readable storage medium is provided. The computer readable storage medium stores a computer executable instruction. When at least one processor of a base station executes the computer executable instruction, the base station performs the data transmission method according to any one of the first aspect or the implementations of the first aspect or any one of the fifth aspect or the implementations of the fifth aspect.

According to a fifteenth aspect of the embodiments of this application, a computer readable storage medium is provided. The computer readable storage medium stores a computer executable instruction. When at least one processor of a terminal executes the computer executable instruction, the terminal performs the data transmission method according to any one of the second aspect or the implementations of the second aspect.

According to a sixteenth aspect of the embodiments of this application, a computer readable storage medium is provided. The computer readable storage medium stores a computer executable instruction. When at least one processor of a base station executes the computer executable instruction, the base station performs the data transmission method according to any one of the third aspect or the implementations of the third aspect or any one of the fourth aspect or the implementations of the fourth aspect.

According to a seventeenth aspect of the embodiments of this application, a computer program product is provided. The computer program product includes a computer executable instruction. The computer executable instruction is stored in a computer readable storage medium. At least one processor of a base station may read the computer executable instruction from the computer readable storage medium, and the at least one processor executes the computer executable instruction, so that the base station implements the data transmission method according to any one of the first aspect or the implementations of the first aspect or any one of the fifth aspect or the implementations of the fifth aspect.

According to an eighteenth aspect of the embodiments of this application, a computer program product is provided. The computer program product includes a computer executable instruction. The computer executable instruction is stored in a computer readable storage medium. At least one processor of a terminal may read the computer executable instruction from the computer readable storage medium, and the at least one processor executes the computer executable instruction, so that the terminal implements the data transmission method according to any one of the second aspect or the implementations of the second aspect.

According to a nineteenth aspect of the embodiments of this application, a computer program product is provided. The computer program product includes a computer executable instruction. The computer executable instruction is stored in a computer readable storage medium. At least one processor of a base station may read the computer executable instruction from the computer readable storage medium, and the at least one processor executes the computer executable instruction, so that the base station implements the data transmission method according to any one of the third aspect or the implementations of the third aspect or any one of the fourth aspect or the implementations of the fourth aspect.

According to the data transmission method and apparatus provided in the embodiments of this application, when the terminal in the inactive state needs to send data, the terminal sends the data and an identity of the terminal to the serving base station that provides an interface. Uplink data of the terminal is forwarded to the anchor base station by using the serving base station and through an interaction between the anchor base station and the serving base station that currently provides the air interface resource for the terminal, and is then transmitted to the core network. Neither context migration nor switching between the core network and the base station needs to be performed. Therefore, signaling and interface overheads are reduced, and data transmission efficiency is improved.

DETAILED DESCRIPTION OF ILLUSTRATIVE EMBODIMENTS

Each time a serving base station of a terminal changes, context migration needs to be performed, switching of a connection between a core network and a base station needs to be implemented during data transmission, and an anchor base station needs to be changed. Change of the anchor base station results in a terminal key update and context obtaining. This causes relatively high signaling overheads. In addition, when the terminal moves between two base stations, a context of the terminal is frequently migrated between the two base stations, and interface overheads between the base stations and the core network and air-interface radio resource control (RRC) signaling overheads are high. To resolve the foregoing problems, embodiments of this application propose a data transmission method. When a terminal is in an inactive state, uplink data of the terminal or downlink data for the terminal is transmitted through an interaction between a serving base station and an anchor base station, with no need of switching of a link between a core network and a base station. Therefore, interface and signaling overheads are reduced.

Figure 1:
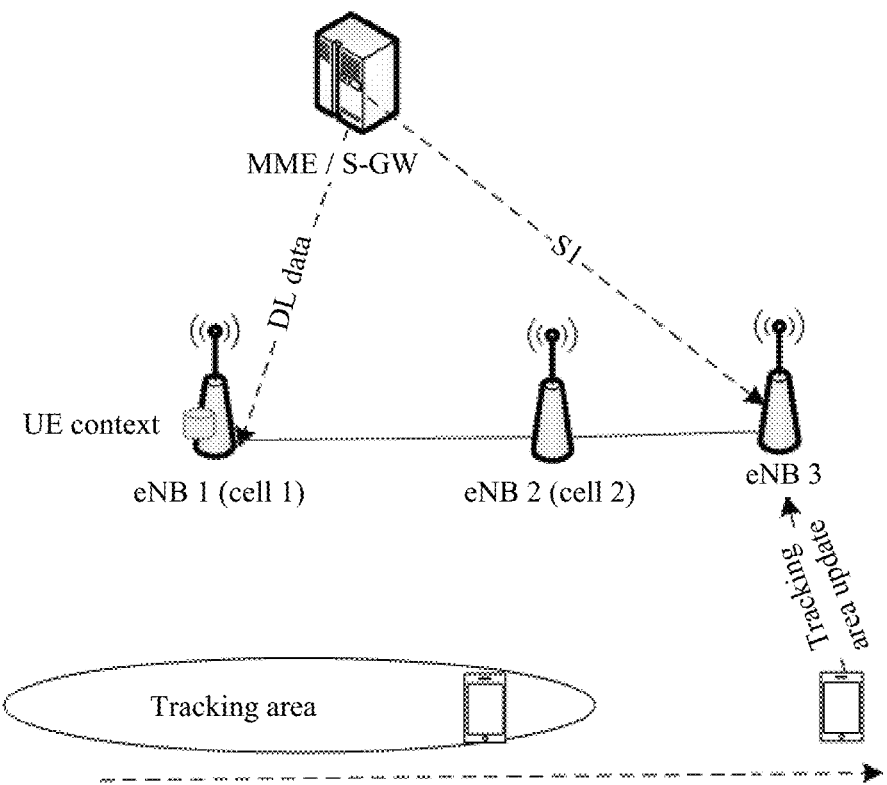
FIG. 1 is a schematic diagram of a tracking area update of UE data.
Figure 2:
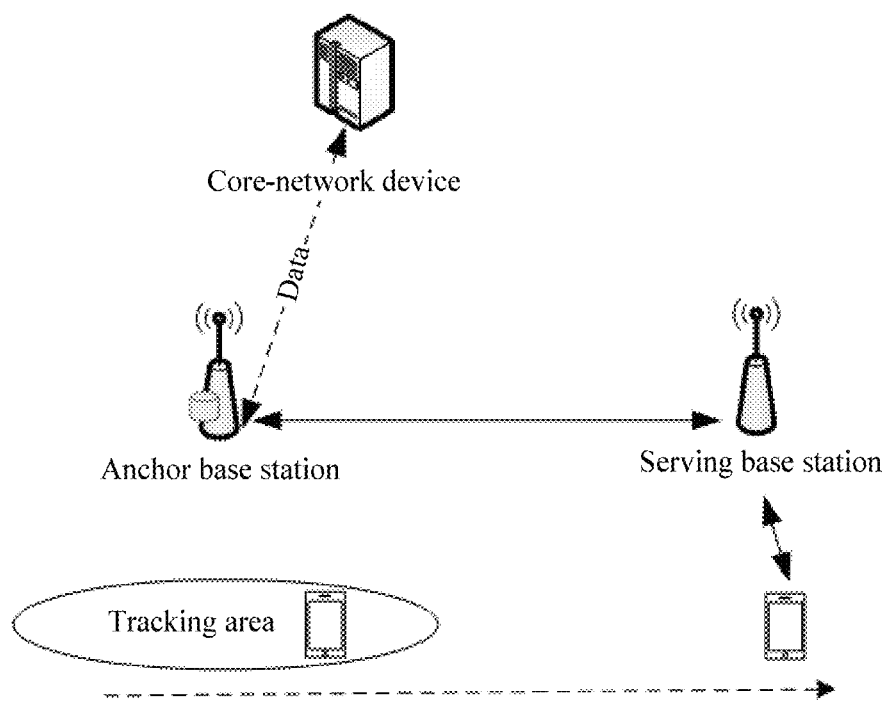
FIG. 2 is a schematic diagram of an application architecture of a data transmission method according to an embodiment of this application.

FIG. 2 is a schematic diagram of an application architecture of a data transmission method according to an embodiment of this application. As shown in FIG. 2, a terminal is used as an example. The terminal may move back and forth between tracking areas of a plurality of base stations (also referred to as cells, radio access network nodes, or the like). In this solution, the data transmission method provided in this embodiment of this application is described by using, as an example, an anchor base station to which the terminal is connected when the terminal is in an active state and a serving base station providing an interface for the terminal after the terminal moves.

Figure 3:
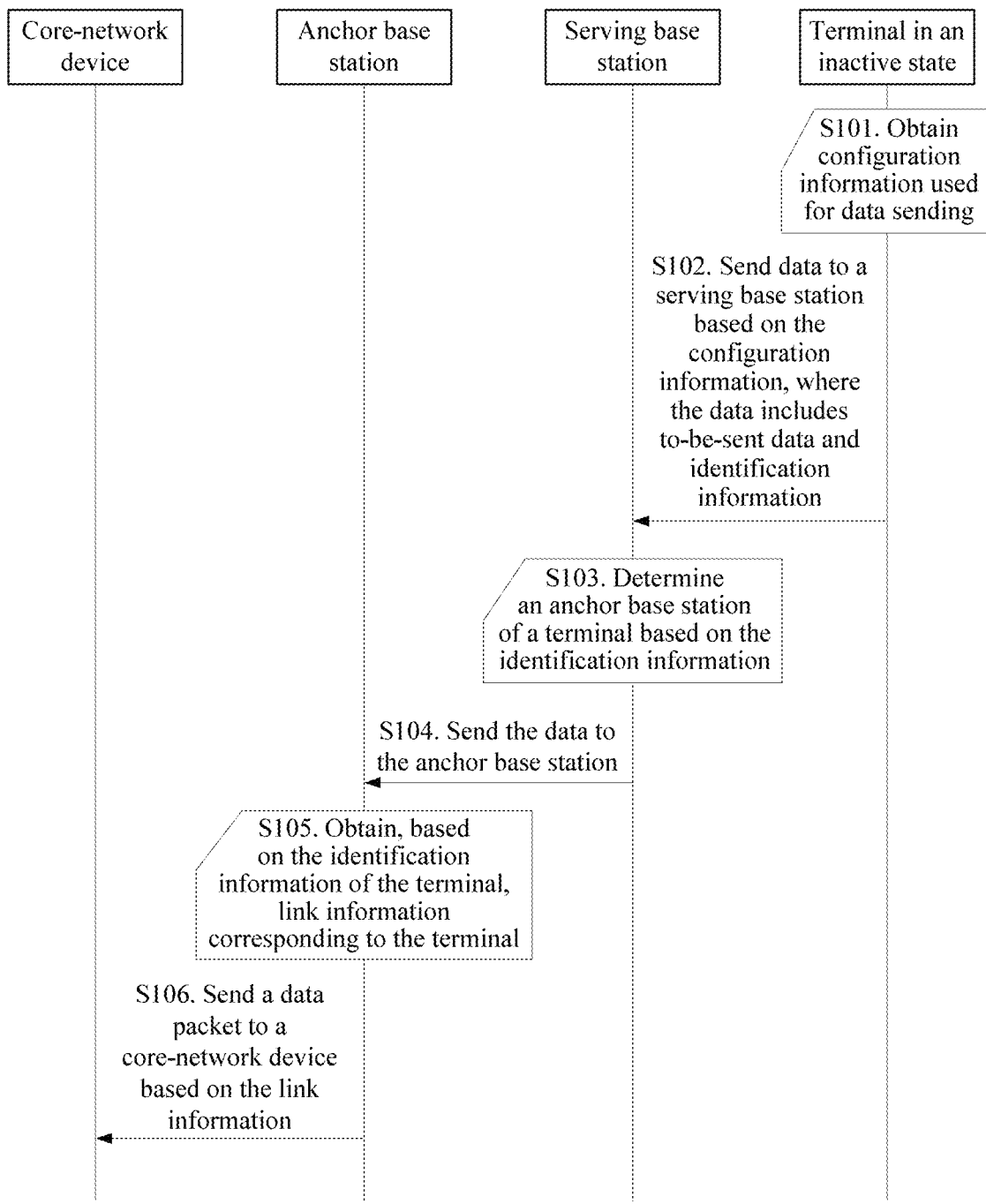
FIG. 3 is a schematic flowchart of Embodiment 1 of a data transmission method according to an embodiment of this application.

FIG. 3 is a schematic flowchart of Embodiment 1 of a data transmission method according to an embodiment of this application. As shown in FIG. 3, based on the schematic diagram of application shown in FIG. 2, the method for transmitting uplink data of a terminal in an inactive state may specifically include the following steps.

S101. Obtain configuration information used for data sending.

This step is performed by the terminal. The terminal is a user-side device that needs to perform uplink/downlink data exchange, for example, a mobile phone or a tablet computer. When the terminal in the inactive state needs to send uplink data, the terminal may obtain the configuration information used for data sending.

A specific obtaining manner includes at least one of the following.

In a first manner, the terminal receives the configuration information broadcast by a serving base station.

In a second manner, the terminal obtains the configuration information preconfigured in a protocol, in other words, obtains the configuration information from the protocol.

In a third manner, the terminal receives the configuration information sent by an anchor base station.

In a fourth manner, when the terminal enters the inactive state from an active state, the terminal stores a packet data convergence protocol (PDCP) entity and a radio link control (RLC) entity of each logical channel, and resets a MAC entity and/or a physical channel configuration. The terminal may directly obtain the locally stored configuration information. The PDCP entity and the RLC entity include a PDCP entity context and an RLC entity context, respectively. The MAC entity includes a MAC entity context.

In a fifth manner, when the terminal enters the inactive state from an active state, the terminal stores a packet data convergence protocol (PDCP) entity and context, and resets a radio link control (RLC) entity and context and/or a MAC entity and/or a physical channel configuration. The terminal directly obtains the locally stored configuration information.

In a sixth manner, when the terminal enters the inactive state from an active state, the terminal stores or configures a packet data convergence protocol PDCP entity, and resets an RLC entity and/or a MAC entity and/or a physical channel configuration. The PDCP entity includes a PDCP entity context. The MAC entity includes a MAC entity context.

In any one of the foregoing implementations, the configuration information includes at least one of feedback or retransmission configuration information, physical layer parameter configuration information, non-scheduled transmission configuration information, MAC layer control information, and channel configuration information.

The feedback or retransmission configuration information includes at least one of the following: a hybrid automatic repeat request (HARQ) process number, a retransmission redundancy version, an indication about whether to reset media access control (MAC), a physical downlink control channel (PDCCH) time-frequency resource used for feedback or downlink data sending, a timing relationship from uplink sending to downlink feedback, and a timing relationship from downlink sending to uplink feedback. In the indication about whether to reset MAC, the resetting means releasing or zeroing out stored MAC layer configuration information, for example, releasing a channel corresponding to a MAC layer, or zeroing a MAC-layer timer. In addition, RLC resetting is also mentioned in this specification, and means, for example, releasing a channel corresponding to an RLC layer, zeroing an RLC-layer timer, or zeroing a sequence number SN of RLC.

The physical layer parameter configuration information includes at least one of the following: transmission time interval (TTI) duration, a cyclic prefix (CP), a subcarrier spacing, and a physical channel type.

The non-scheduled transmission configuration information includes at least one of the following: a quantity of times of non-scheduled uplink blind retransmission, a non-scheduled automatic retransmission interval, non-scheduled transmission signal received power expected by a base station, a non-scheduled transmission power boost step, a demodulation reference signal DRMS list available for non-scheduled transmission, and a modulation and coding scheme (MCS) available for non-scheduled transmission. The non-scheduled transmission configuration information may further include non-scheduled transmission configuration information. In this solution, the non-scheduled transmission means that the terminal directly performs one or more times of uplink sending after obtaining an uplink sending resource by using a broadcast message; or the terminal performs one or more times of uplink sending after obtaining an uplink sending resource by using a dedicated message.

The MAC layer control information includes at least one of the following: whether to report channel state information (CSI), periodic or aperiodic CSI reporting, a CSI reporting class, whether to report a power headroom report (PHR), periodic or aperiodic PHR reporting, whether to report a buffer status report (BSR), a BSR reporting format, and periodic or aperiodic BSR reporting.

The channel configuration information includes at least one of the following: an RLC configuration corresponding to a service channel, a correspondence between a service channel and a flow identifier, and an RLC configuration corresponding to a control channel.

The configuration information further includes identification information of the terminal. The terminal (namely, UE) is used as an example in the following descriptions. For example, the identification information of the terminal may be an RNA UE ID, a resume ID, a C-RNTI, or terminal identification information allocated by a core network. The identification information of the terminal may be allocated or sent by the anchor base station or the serving base station.

S102. Send data to a serving base station based on the configuration information, where the data includes to-be-sent data and identification information.

In this step, after obtaining the configuration information, the terminal sends the uplink data based on the configuration information, and places the to-be-sent data and the identification information of the terminal into the same data for sending. The identification information of the terminal may be a unique identifier used to indicate the terminal in an access-network notification area in which the terminal is located, or a cell radio network temporary identifier (C-RNTI), or an identifier allocated by a core-network device.

The identification information of the terminal may be allocated by the anchor base station to the terminal, may be allocated by the core-network device, or may be allocated by the serving base station to the terminal. This is not limited in this solution.

In a specific implementation of this solution, when the terminal is in the inactive state (namely, the inactive state), the following identifiers may exist: the radio access network notification area (RAN Notification Area, RNA) UE ID and the C-RNTI. The RNA UE ID identifies a base station to which the terminal belongs, and is a unique identity of the terminal under the base station. Optionally, a network allocates the C-RNTI to the terminal. When an RNA is a single cell, the C-RNTI is preferentially allocated to the terminal. The RNA UE ID indicates information about an anchor base station that allocates the ID, and further indicates unique terminal identification information of the terminal under the base station.

Optionally, when the terminal performs sending by using the C-RNTI or the identifier allocated by the core network, the terminal sends information about a cell, a base station, or an RNA that allocates the C-RNTI. The serving base station may determine the anchor base station based on the information about the cell, the base station, or the RNA, for example, through network management configuration.

Optionally, the inactive state may further include an idle state in LTE. In this case, some or all configuration parameters in a connected state are stored. In this case, a UE ID may be a resume ID.

After obtaining the configuration information, the terminal encrypts the to-be-sent data by using a pre-obtained key or a key obtained through calculation, to obtain data, and sends the data together with the identification information of the terminal or other signaling to the serving base station.

In addition, the terminal may further send, to the serving base station, a logical channel identifier corresponding to the data. The logical channel identifier may be carried in the data or not carried in the data.

The serving base station receives the data sent by the terminal, where the data carries at least the data sent by the terminal and the identification information of the terminal.

S103. Determine an anchor base station of a terminal based on the identification information.

This step is performed by the serving base station of the terminal. The serving base station provides an air interface for the terminal. After receiving the data sent by the terminal, the serving base station determines the anchor base station of the terminal based on the identification information of the terminal in the data, so as to transmit the uplink data of the terminal to the core-network device by using the anchor base station of the terminal.

In a specific implementation of this solution, the serving base station may allocate or release the identification information of the terminal. The C-RNTI is used as an example. Occasions for allocating the C-RNTI to the terminal include: during data transmission (random access channel (RACH) data transmission or contention-based data transmission), after cell reselection, when the terminal enters the inactive state from the active state, when an RNA location update notification is received, and the like. Optionally, the C-RNTI is retained for a period of time. The RNA location update notification means that the terminal notifies, when a RNA changes, the base station of an RNA in which the terminal is located; or periodically notifies the base station of an RNA in which the terminal is located.

For example, when the RNA changes or the anchor base station of the terminal changes, a new anchor base station allocates an RNA ID or a resume ID, and notifies the terminal of the RNA ID or the resume ID.

Optionally, after allocating new terminal identification information (for example, a C-RNTI) to the terminal, the serving base station notifies the anchor base station of the new terminal identification information, in other words, the serving base station allocates the new terminal identification information to the terminal, and sends the new terminal identification information to the anchor base station.

An occasion for releasing the C-RNTI of the terminal includes: releasing the C-RNTI of the terminal in an implicit or explicit manner. The C-RNTI may be synchronously released by using an inactive timer or L2/L1 signaling. Alternatively, the C-RNTI is released only when the terminal enters the idle state or sends uplink data in another cell. To be specific, the serving base station starts a timer after receiving the data, and deletes the identification information of the terminal after the timer expires, and may send a terminal identity deletion instruction to the anchor base station, to instruct the anchor base station to delete the identification information of the terminal. In this solution, if the anchor base station does not participate in terminal identity management, the serving base station does not need to notify the anchor base station when releasing the identification information of the terminal.

In an optional implementation solution, the anchor base station maintains the C-RNTI based on an inactive timer. For example, the anchor base station starts the inactive timer after receiving uplink or downlink data, and deletes the identification information of the terminal after the timer expires.

S104. Send the data to the anchor base station.

In this step, the serving base station sends the data to the anchor base station of the terminal.

The data may include complete or partial RLC data received from the terminal, or complete or partial MAC data received from the terminal.

After demultiplexing the received data, the serving base station further needs to send an IP flow identifier and/or a logical channel identifier and/or a logical channel type to the anchor base station.

When there is no one-to-one mapping relationship between a logical channel and an IP flow or a radio access bearer, IP flow information further needs to be sent to the anchor base station. The IP flow information may be in a MAC layer protocol unit, an RLC layer protocol unit, or a PDCP layer protocol unit sent by the terminal.

In addition, the serving base station may further send, to the anchor base station, a logical channel and/or a channel type corresponding to the data sent by the terminal. Likewise, the logical channel is included in or not included in data obtained through processing by the serving base station.

When the RLC entity is on the anchor base station, the serving base station sends a MAC packet to the anchor base station; or when the RLC entity is on the serving base station, the serving base station sends an RLC packet to the anchor base station. The MAC packet and the RLC packet may not include logical channel information.

In an optional implementation, when a base-station-level transmission link is established between the serving base station and the anchor base station, the terminal needs to send the C-RNTI and a cell identifier to the anchor base station. When a cell-level common transmission link is established between the serving base station and the anchor base station, the serving base station sends the C-RNTI to the anchor base station through the link. When a dedicated terminal link is established between the serving base station and the anchor base station, the terminal does not need to send any terminal ID to the anchor base station.

In an optional implementation, when the RNA UE ID or the resume ID is sent between the serving base station and the anchor base station, a common or dedicated bearer between the serving base station and the anchor base station may be used.

In an optional implementation, considering that a small amount of data is transmitted without state switching and a large amount of data is transmitted with state switching, the terminal may determine a to-be-used manner based on an amount of to-be-sent data, or the serving base station determines, based on a BSR status in non-scheduled data, whether to perform migration from the anchor base station to the serving base station or switch the terminal to an active connected state.

S105. Obtain, based on the identification information of the terminal, link information corresponding to the terminal.

This step is performed by the anchor base station. After receiving the data sent by the serving base station, the anchor base station obtains, based on the identification information of the terminal carried in the data, the link information corresponding to the terminal. Herein, the link information is information about a link that is established between the anchor base station and the core-network device when the terminal transmits the data to the anchor base station and that is specially used to transmit the data of the terminal, for example, IP flow information or radio access bearer information.

S106. Send the data to a core-network device based on the link information.

In this step, the anchor base station sends the received data to the core-network device based on the link information corresponding to the terminal, to complete uplink data transmission of the terminal in the inactive state.

In this process, switching of a link between the core-network device and a base station does not need to be performed, and the serving base station does not need to obtain a context from the anchor base station of the terminal either, in other words, context migration does not need to be performed.

According to the data transmission method provided in this embodiment, the uplink data of the terminal is forwarded to the anchor base station by using the serving base station and through an interaction between the anchor base station and the serving base station that currently provides an air interface resource for the terminal, and the anchor base station sends the data to the core-network device. Neither context migration nor switching between the core network and a base station needs to be performed. Therefore, signaling and interface overheads are reduced, and data transmission efficiency is improved.

Figure 4:
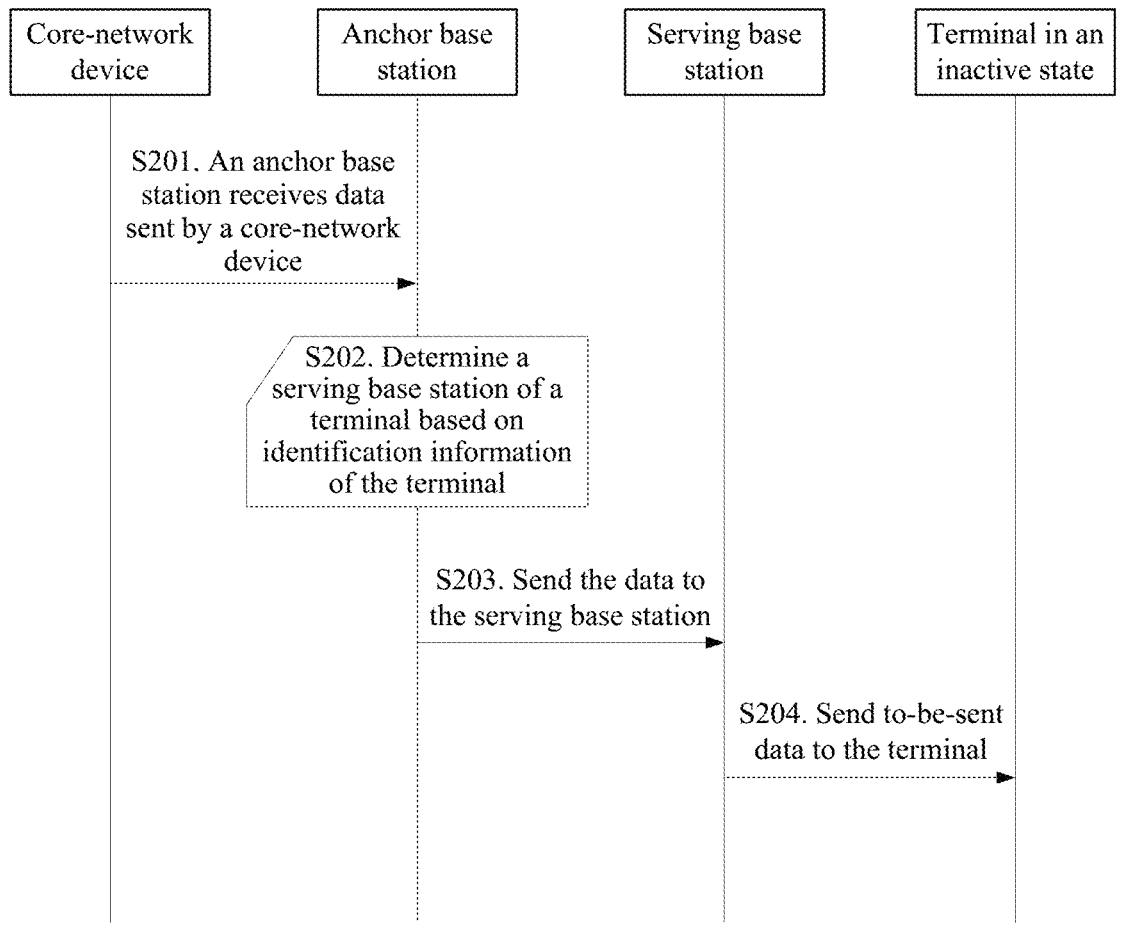
FIG. 4 is a schematic flowchart of Embodiment 2 of a data transmission method according to an embodiment of this application.

FIG. 4 is a schematic flowchart of Embodiment 2 of a data transmission method according to an embodiment of this application. As shown in FIG. 4, specific steps of transmitting, by a core-network device, downlink data to a terminal include the following steps.

S201. An anchor base station receives data sent by the core-network device.

In this step, when or before the core-network device needs to send downlink data to the terminal, the core-network device sends the data to the anchor base station through a link that is established between the core-network device and the anchor base station of the terminal and that is specially used to transmit terminal data.

When no dedicated bearer is established between the anchor base station and the core-network device, the data includes the to-be-sent data that is to be sent by the core-network device to the terminal and identification information of the terminal, or the core-network device sends only the data to the anchor base station after receiving a paging response.

In this solution, the core-network device may be a device such as a mobility management entity (MME) or a gateway.

S202. Determine a serving base station of the terminal based on identification information of the terminal.

When the core-network device has established a dedicated bearer, an identity of the terminal does not need to be obtained in step S202; instead, a user is determined based on dedicated bearer information.

If the anchor base station has no C-RNTI, for example, a C-RNTI has expired or has been released, the anchor base station may initiate a paging process, to instruct a nearby base station or the serving base station to page the terminal. A paging message may be generated by the anchor base station or the serving base station. Some or all parameters for determining paging, for example, the identity of the terminal or a paging occasion calculation parameter, may be provided by the anchor base station. After the paging response is received, S203 is performed.

If the anchor base station has a valid C-RNTI of the terminal, S203 is performed.

In an optional implementation, regardless of whether a C-RNTI exists, the anchor base station sends the data and the identity of the terminal to the serving base station.

S203. Send the data to the serving base station.

The anchor base station determines the serving base station that currently provides an air interface resource for the terminal, and sends the received data to the serving base station.

If the anchor base station cannot determine the serving base station to which the terminal belongs, the serving base station of the terminal notifies the anchor base station after receiving the paging response.

In an implementation, if there is no terminal-specific transmission channel between the anchor base station and the serving base station, an RNA UE identifier or a resume ID identifier is sent to the serving base station.

In an implementation, the anchor base station may send a valid C-RNTI. If there is no cell-level dedicated transmission channel between the anchor base station and the serving base station, an identifier of a serving cell is further sent, and the information is notified by the serving base station to the anchor base station.

If there is the terminal-specific transmission channel between the anchor base station and the serving base station, the identity of the terminal is not sent to the serving base station.

S204. Send to-be-sent data to the terminal.

In this step, the serving base station receives the data sent by the anchor base station, where the data includes the to-be-sent data that is to be sent to the terminal and the identification information of the terminal; and sends the to-be-sent data to the terminal based on the identification information of the terminal, to complete downlink data transmission of the terminal.

In a possible implementation, UE is used as an example. The C-RNTI of the terminal is found based on the RNA UE identifier or the resume ID identifier sent by the anchor base station, and data is sent in a cell in which the terminal is located.

In a possible implementation, based on the RNA UE identifier or the resume ID identifier sent by the anchor base station, data and the ID are added to downlink transmission content, and downlink sending is performed by using a common RNTI, for example, a P-RNTI, or a common RNTI allocated to the UE when the UE enters an inactive state.

In a possible implementation, data is sent, based on the C-RNTI sent by the anchor base station, in a cell in which the terminal is located.

In this solution, similar to that in uplink data information, the identification information of the terminal includes: information about a unique identifier used to indicate the terminal in an access-network notification area in which the terminal is located, or the C-RNTI allocated to the terminal.

According to the data transmission method provided in this embodiment, the downlink data transmission of the terminal is implemented through an interaction between the serving base station and the anchor base station. The serving base station does not need to establish a link to the core-network device, but directly receives, by using the anchor base station, the downlink data sent by the core-network device by using the anchor base station, and forwards the downlink data to the terminal based on the identification information of the terminal. Therefore, interface resources are saved, and signaling overheads are reduced.

In an implementation process of the data transmission method provided in any one of the foregoing embodiments, the interaction between the anchor base station and the serving base station may be MAC layer data exchange, or may be RLC layer data exchange. Uplink data transmission is used as an example. Details are as follows.

Figure 5:
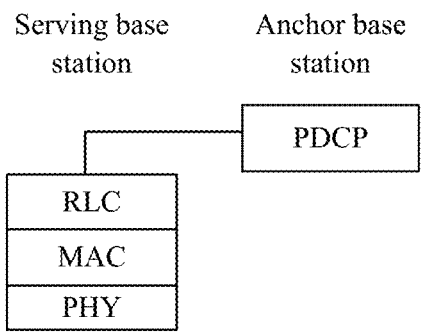
FIG. 5 is a schematic diagram of a design of an anchor base station and a serving base station in a data transmission method according to an embodiment of this application.

FIG. 5 is a schematic diagram of a design of an anchor base station and a serving base station in a data transmission method according to an embodiment of this application. As shown in FIG. 5, the serving base station may be responsible for maintaining a physical layer, a MAC layer, and an RLC layer; and the anchor base station maintains a packet data convergence protocol (Packet Data Convergence Protocol, PDCP) layer, and is responsible for security and maintaining a connection to a core-network device. In this case, data sent by the serving base station to the anchor base station is complete or partial RLC data.

Optionally, some RLC layer functions are configured on the serving base station, and some RLC functions are configured on the anchor base station.

The RLC functions include at least one of the following functions: an automatic repeat request (ARQ) function, segmentation, and re-sorting.

Optionally, a downlink RLC function is configured on the serving base station, and an uplink RLC function is configured on the anchor base station.

In an optional implementation, the serving base station is a distributed unit DU, and the anchor base station is a centralized unit CU.

Figure 6:
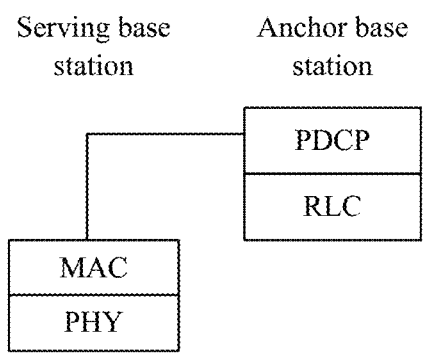
FIG. 6 is a schematic diagram of another design of an anchor base station and a serving base station in a data transmission method according to an embodiment of this application.

FIG. 6 is a schematic diagram of another design of an anchor base station and a serving base station in a data transmission method according to an embodiment of this application. As shown in FIG. 6, the serving base station may be alternatively responsible for maintaining a physical layer and a MAC layer, and the anchor base station maintains an RLC layer and a PDCP layer. In this case, data sent by the serving base station to the anchor base station is MAC data. This means that the anchor base station maintains the RLC layer and the PDCP layer, and is responsible for an ARQ, segmentation, and the like, and security, and the serving base station maintains the physical layer (PHY) and MAC; in this case, the data sent by the serving base station to the anchor base station is complete or partial MAC data.

Optionally, in this embodiment of this application, some RLC functions of the anchor base station may be moved down to MAC, and some RLC functions of the anchor base station may be moved up to PDCP of the serving base station.

Configuration management: After a terminal enters an inactive state from an active state, or a cell of the terminal changes, the terminal resets MAC and the PHY, and maintains, by default, a relationship between RLC, an RB/a logical channel, and a flow identifier (flow ID) that are dedicated for the active state. Upon state switching, a network may instruct the terminal to delete some bearers.

Data sending: If the cell of the terminal does not change, the terminal sends to-be-sent data and identification information (for example, a C-RNTI). After the cell changes, the terminal sends to-be-sent data and an RNA UE ID/(a C-RNTI and information about a cell that allocates the C-RNTI).

Data transmission between base stations: Data received by the serving base station includes the to-be-sent data and the identification information of the terminal. The serving base station determines an original gNB, namely, an anchor base station, based on the identification information of the terminal. After the gNB changes, the serving base station sends, to the anchor base station of the terminal, MAC service data unit (SDU) data and a logical channel/flow ID, namely, an RNA UE ID.

In a specific implementation of this solution, after receiving the data sent by the terminal, the serving base station obtains an RLC configuration parameter from the anchor base station, that is, the serving base station receives configuration information and/or state information, sent by the anchor base station, of an RLC entity corresponding to the terminal, and establishes the RLC entity. After an inactive timer expires, the RLC entity is released. Usually, the inactive timer is started or restarted when uplink or downlink data is received.

In an optional implementation, the serving base station may alternatively establish a MAC entity or an RLC entity corresponding to the terminal, after a contention-based sending conflict is resolved, for example, after random access is completed or contention-based non-scheduled transmission is completed, or when it is determined that the anchor base station successfully receives the data, or after uplink data of the terminal is successfully sent and an acknowledgement message is returned to the terminal.

In the foregoing two implementations, if there are a plurality of logical channels, a plurality of RLC entities corresponding to the plurality of logical channels need to be established; or if there is only one logical channel, there is only one RLC entity.

When the terminal transmits uplink data on an air interface, the data may be sent in a contention-based manner, or the data may be sent through a RACH. Specifically, contention-based data sending is used as an example. The terminal sends data (including a logical channel, a flow identifier, and the identification information of the terminal (for example, the RNA UE ID)) to the serving base station, and receives, from the serving base station, feedback information that carries an RNA ID and an allocated C-RNTI (in other words, the terminal obtains new terminal identification information allocated by the serving base station). The RNA ID may be an original cell ID and a C-RNTI allocated by an original cell. If mapping between the flow ID and the logical channel is determined, the terminal may not send the flow ID.

Optionally, when the terminal has a valid C-RNTI and the terminal further performs uplink sending in a cell that allocates the C-RNTI, the C-RNTI is used to replace the RNA UE ID. If the terminal supports a plurality of UE IDs, a type of a sent identifier is indicated. For example, whether the RNA UE ID or the C-RNTI is used is indicated. Optionally, an original cell ID and an original C-RNTI of the terminal are used to replace the RNA UE ID. Optionally, after a cell of the terminal changes, RLC, MAC, and the PHY are reset. After an uplink sending conflict is resolved, the base station establishes an RLC entity and a MAC entity.

An uplink data transmission process between the serving base station and the anchor base station is as follows: The serving base station determines, based on the RNA ID, the anchor base station to which the terminal belongs; and after the anchor base station changes, forwards RLC SDU data, a logical channel/flow ID, and an RNA UE ID to an anchor base station. After performing decryption and/or integrity protection processing, the anchor base station forwards service data to a core-network device in a corresponding flow.

A downlink data transmission process between the base stations is as follows: The anchor base station sends downlink data and the identification information of the terminal (for example, the C-RNTI, the RAN UE ID, or a resume ID) to the serving base station.

A terminal context update is as follows: The serving base station sends the C-RNTI and the RNA UE ID (or the original C-RNTI and the original cell ID) together with data to the anchor base station. Optionally, the serving base station receives an acknowledgement response. Alternatively, through a signaling interaction between the base stations, the anchor base station is instructed to update a C-RNTI corresponding to the RNA UE ID and a cell that allocates the C-RNTI.

In the data transmission method provided in any one of the foregoing implementations, a specific case of interface management between the base stations is as follows:

A common or dedicated bearer is established between the serving base station and the anchor base station. The common bearer may be based on a cell granularity or a base station granularity. Before data sending, establishment of the common or dedicated bearer is triggered. Establishment of a common bearer based on a cell or a base station may be triggered before data sending.

Context migration and switching of a connection/bearer between a CN and a base station is as follows: The serving base station determines, based on a BSR and a network load status, whether to trigger obtaining a context, switching a connection between the CN and a RAN, and obtaining an update key and a deduction parameter.

When the serving base station (an RNA) is a single cell, this architecture is used, and a C-RNTI is allocated and maintained. If the C-RNTI needs to be released, optionally, the anchor base station and/or the terminal are/is explicitly instructed to release the C-RNTI.

When the terminal needs to send uplink data or the core-network device needs to send downlink data to the terminal, through an interaction between the serving base station and the anchor base station, in uplink transmission, the serving base station sends data to the core-network device by using the anchor base station, so as to implement uplink data transmission; and in downlink transmission, the anchor base station receives data delivered by the core network, and forwards the data to the terminal by using the serving base station. In this solution, the interaction between the serving base station and the anchor base station may be RLC data, or may be MAC data. In the uplink transmission process, neither context migration nor switching of a link between the core network and a base station needs to be performed. Therefore, interface resources are saved, and transmission efficiency is improved.

Based on the technical solution provided in any one of the foregoing embodiments, uplink data transmission is used as an example. When sending data, the terminal obtains to-be-sent data, and then performs encryption processing and/or integrity protection on the to-be-sent data by using a pre-obtained key or a key currently obtained through calculation. Therefore, the terminal needs to obtain the key. A specific manner is as follows: After entering the inactive state, the terminal stores a key used in a previous data transmission process, and may directly use the key in a subsequent data transmission process in which the terminal is in the inactive state, or may obtain a new key by performing deduction based on a deduction parameter, and instruct a base station side to update the key.

Specific implementations of determining whether to change a key include the following.

The terminal receives indication information sent by the anchor base station, where the indication information is used to indicate whether the terminal needs to update a key, and if the indication information indicates that the terminal does not need to change the key, the terminal determines that the key obtained last time can still be used; or if the indication information indicates that the terminal needs to update the key, the terminal obtains a new key by performing deduction by using a deduction parameter received last time; and optionally, the terminal may send key update indication information to the serving base station, to instruct the serving base station to change the key, where the key update indication information may include the deduction parameter used by the terminal to obtain the new key through deduction.

The terminal does not change a key in the following cases: a network notifies the terminal that a cell in which the terminal is located is CU-DU separated/secure; in this case, the terminal considers that a key received in the cell is secure, and in subsequent uplink sending, the terminal always uses the key for security protection, including protection of user-plane or control-plane data; the terminal indicates to the serving base station that a used key is secure; or the terminal notifies the serving base station of whether the anchor base station of the terminal is CU-DU separated, or notifies the serving base station of only information about an original cell, so that the serving base station can determine whether the terminal needs to change a key; or the serving base station determines that an original cell to which the terminal belongs is CU-DU separated and a key is secure, and therefore does not instruct the terminal to change the key.

The terminal changes a key in the following cases (a key is changed each time a cell changes; or a cell in which a key is used by the terminal last time is not CU-DU separated, or it is considered that a network indicates that the cell is insecure): the terminal performs deduction by using a deduction parameter received last time, and indicates to the network that a key is updated, and optionally, notifies the network of the used deduction parameter; or the terminal still uses a key used last time, for protection, and notifies the serving base station of information about an anchor cell and that the key is insecure or the anchor cell is not CU-DU separated; and if the network determines that the key used by the terminal needs to be updated, the network instructs the terminal to change the key, for example, instructs the terminal to perform key deduction by using a deduction parameter sent last time; or sends a deduction parameter to the terminal, and the terminal makes an acknowledgement.

In this implementation, if a key of the terminal is secure, the key does not need to be updated. This can reduce, to some extent, signaling overheads caused by a key update of the terminal in the inactive state.

Figure 7:
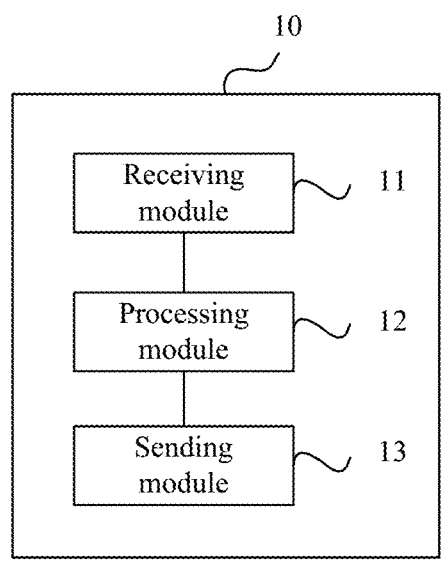
FIG. 7 is a schematic structural diagram of Embodiment 1 of a data transmission apparatus according to an embodiment of this application.

FIG. 7 is a schematic structural diagram of Embodiment 1 of a data transmission apparatus according to an embodiment of this application. The data transmission apparatus 10 includes: a receiving module 11, configured to receive data sent by a terminal in an inactive state, where the data includes to-be-sent data sent by the terminal and identification information of the terminal; a processing module 12, configured to determine an anchor base station of the terminal based on the identification information; and a sending module 13, configured to send the data to the anchor base station.

The data transmission apparatus provided in this embodiment is configured to perform a technical solution on a serving base station side in a process of the data transmission method provided in any one of the foregoing embodiments. An implementation principle and a technical effect thereof are similar. Details are not described herein again.

Based on the foregoing embodiment, the receiving module 11 is further configured to receive a logical channel identifier corresponding to the data sent by the terminal; and the sending module 13 is further configured to send, to the anchor base station, a logical channel identifier and/or a channel type corresponding to the to-be-sent data, where the logical channel identifier is included in the data or not included in the data.

In a specific implementation, the identification information received by the receiving module 11 includes: a unique identifier used to indicate the terminal in an access-network notification area in which the terminal is located; or a C-RNTI; or an identifier allocated by a core-network device.

In a specific implementation, the sending module 13 is further configured to broadcast configuration information: at least one of feedback or retransmission configuration information, physical layer parameter configuration information, non-scheduled transmission configuration information, MAC layer control information, and channel configuration information.

The feedback or retransmission configuration information includes at least one of the following: a HARQ process number, a retransmission redundancy version, an indication about whether to reset MAC, a PDCCH time-frequency resource used for feedback or downlink data sending, a timing relationship from uplink sending to downlink feedback, and a timing relationship from downlink sending to uplink feedback.

The physical layer parameter configuration information includes at least one of the following: TTI duration, a CP length, a subcarrier spacing, and a physical channel type.

The non-scheduled transmission configuration information includes at least one of the following: a quantity of times of non-scheduled uplink blind retransmission, a non-scheduled automatic retransmission interval, non-scheduled transmission signal received power expected by a base station, a non-scheduled transmission power boost step, a DRMS list available for non-scheduled transmission, and an MCS available for non-scheduled transmission.

The MAC layer control information includes at least one of the following: whether to report CSI, periodic or aperiodic CSI reporting, a CSI reporting class, whether to report a PHR, periodic or aperiodic PHR reporting, whether to report a BSR, a BSR reporting format, and periodic or aperiodic BSR reporting.

The channel configuration information includes at least one of the following: a radio link control RLC configuration corresponding to a service channel, a correspondence between a service channel and a flow identifier, and an RLC configuration corresponding to a control channel.

In a specific implementation, the to-be-sent data received by the receiving module 11 is RLC data, MAC data, or a part of RLC data or MAC data.

In a specific implementation, the data further includes key update indication information sent by the terminal, where the key update indication information may include a deduction parameter.

In a specific implementation, the processing module 12 is further configured to allocate new terminal identification information to the terminal.

In a specific implementation, the sending module 13 is further configured to send the new terminal identification information to the terminal, and/or send the new terminal identification information to the anchor base station.

In a specific implementation, the processing module 12 is further configured to start a timer after the data is received, and delete the identification information of the terminal after the timer expires.

In a specific implementation, the sending module 13 is further configured to send a terminal identity deletion instruction to the anchor base station, to instruct the anchor base station to delete the identification information of the terminal.

In a specific implementation, the processing module 12 is further configured to establish a MAC entity or an RLC entity corresponding to the terminal; or the receiving module 11 is further configured to receive configuration information and/or state information, sent by the anchor base station, of an RLC entity corresponding to the terminal.

The data transmission apparatus provided in any one of the foregoing implementations is configured to perform a technical solution on a serving base station side in any one of the foregoing method embodiments. An implementation principle and a technical effect thereof are similar. Details are not described herein again.

Figure 8:
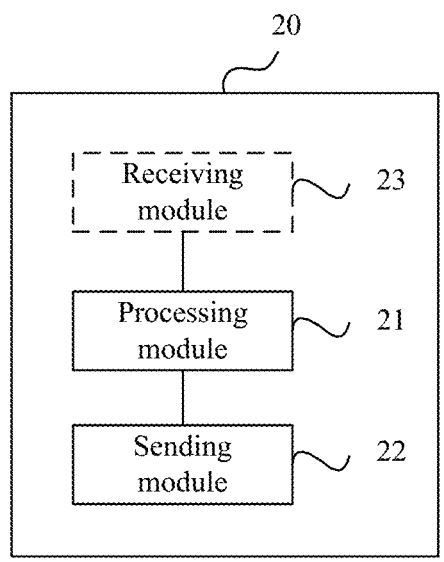
FIG. 8 is a schematic structural diagram of Embodiment 2 of a data transmission apparatus according to an embodiment of this application.

FIG. 8 is a schematic structural diagram of Embodiment 2 of a data transmission apparatus according to an embodiment of this application. The data transmission apparatus 20 includes: a processing module 21, configured to obtain configuration information used for data sending; and a sending module 22, configured to send data to a serving base station based on the configuration information, where the data includes to-be-sent data and identification information.

The data transmission apparatus provided in this embodiment is configured to perform a technical solution on a terminal side in any one of the foregoing method embodiments. An implementation principle and a technical effect thereof are similar. Details are not described herein again.

Based on the foregoing embodiment, the processing module 21 is specifically configured to: when the apparatus enters an inactive state from an active state, store a PDCP entity and an RLC entity of each logical channel, and reset a MAC entity and/or a physical channel configuration; or when the apparatus enters an inactive state from an active state, store or configure a PDCP entity, and reset an RLC entity and/or a MAC entity and/or a physical channel configuration.

In a specific implementation, the identification information of the terminal includes: a unique identifier used to indicate the terminal in an access-network notification area in which the terminal is located; or a C-RNTI; or an identifier allocated by a core-network device.

In a specific implementation, the processing module 21 is further configured to obtain the configuration information preconfigured in a protocol; or the apparatus further includes a receiving module 23, configured to receive the configuration information broadcast by the serving base station or sent by an anchor base station, where the configuration information includes at least one of feedback or retransmission configuration information, physical layer parameter configuration information, non-scheduled transmission configuration information, MAC layer control information, and channel configuration information.

The feedback or retransmission configuration information includes at least one of the following: a HARQ process number, a retransmission redundancy version, an indication about whether to reset MAC, a PDCCH time-frequency resource used for feedback or downlink data sending, a timing relationship from uplink sending to downlink feedback, and a timing relationship from downlink sending to uplink feedback.

The physical layer parameter configuration information includes at least one of the following: TTI duration, a CP length, a subcarrier spacing, and a physical channel type.

The non-scheduled transmission configuration information includes at least one of the following: a quantity of times of non-scheduled uplink blind retransmission, a non-scheduled automatic retransmission interval, non-scheduled transmission signal received power expected by a base station, a non-scheduled transmission power boost step, a DRMS list available for non-scheduled transmission, and an MCS available for non-scheduled transmission.

The MAC layer control information includes at least one of the following: whether to report CSI, periodic or aperiodic CSI reporting, a CSI reporting class, whether to report a PHR, periodic or aperiodic PHR reporting, whether to report a BSR, a BSR reporting format, and periodic or aperiodic BSR reporting.

The channel configuration information includes at least one of the following: an RLC configuration corresponding to a service channel, a correspondence between a service channel and a flow identifier, and an RLC configuration corresponding to a control channel.

In a specific implementation, before the data is sent to the serving base station based on the configuration information, the processing module 21 is further configured to: obtain the to-be-sent data; and perform encryption and/or integrity protection on the to-be-sent data by using a pre-obtained key or a key currently obtained through calculation.

In a specific implementation, before the to-be-sent data is obtained, the receiving module 23 is further configured to receive indication information sent by the anchor base station, where the indication information is used to indicate whether the terminal needs to update a key; and if the indication information indicates that the terminal does not need to change the key, the processing module 21 determines that the key obtained last time can still be used.

In a specific implementation, if the indication information indicates that the terminal needs to update the key, the processing module 21 is further configured to obtain a new key by performing deduction by using a deduction parameter received last time; and the sending module 22 is further configured to send key update indication information to the serving base station, where the key update information may include the deduction parameter.

In a specific implementation, the processing module 21 is further configured to obtain new terminal identification information allocated by the serving base station.

The data transmission apparatus provided in any one of the foregoing implementations is configured to perform a technical solution on a terminal side in any one of the foregoing method embodiments. An implementation principle and a technical effect thereof are similar. Details are not described herein again.

Figure 9:
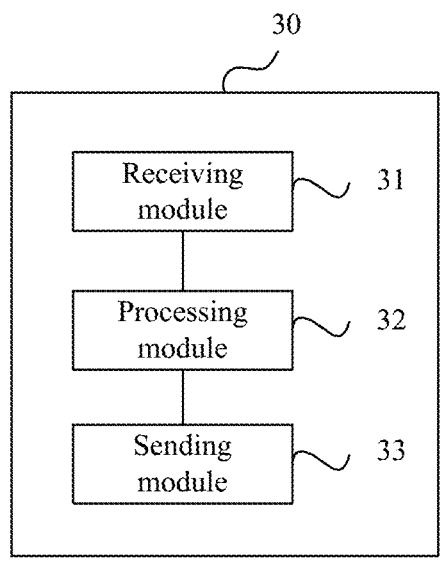
FIG. 9 is a schematic structural diagram of Embodiment 3 of a data transmission apparatus according to an embodiment of this application.

FIG. 9 is a schematic structural diagram of Embodiment 3 of a data transmission apparatus according to an embodiment of this application. The data transmission apparatus 30 includes: a receiving module 31, configured to receive data sent by a serving base station, where the data includes to-be-sent data sent by a terminal and identification information of the terminal; a processing module 32, configured to obtain, based on the identification information of the terminal, link information corresponding to the terminal; and a sending module 33, configured to send the data to a core-network device based on the link information.

The data transmission apparatus provided in this embodiment is configured to perform a technical solution on an anchor base station side in any one of the foregoing method embodiments. An implementation principle and a technical effect thereof are similar. Details are not described herein again.

Based on the foregoing embodiment, the receiving module 31 is further configured to receive a logical channel identifier and/or a channel type that are/is corresponding to the to-be-sent data and that are/is sent by the serving base station, where the logical channel identifier is included in the data or not included in the data.

In a specific implementation, the receiving module 31 is further configured to receive new terminal identification information of the terminal sent by the serving base station.

In a specific implementation, the receiving module 31 is further configured to receive a terminal identity deletion instruction sent by the serving base station; and the processing module 32 is further configured to delete the identification information of the terminal according to the terminal identity deletion instruction.

In a specific implementation, the sending module 33 is further configured to send, to the serving base station, configuration information and/or state information of an RLC entity corresponding to the terminal.

The data transmission apparatus provided in any one of the foregoing implementations is configured to perform a technical solution on an anchor base station side in any one of the foregoing method embodiments. An implementation principle and a technical effect thereof are similar. Details are not described herein again.

Figure 10:
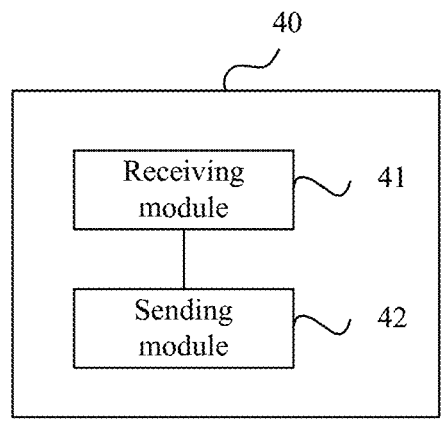
FIG. 10 is a schematic structural diagram of Embodiment 4 of a data transmission apparatus according to an embodiment of this application.

FIG. 10 is a schematic structural diagram of Embodiment 4 of a data transmission apparatus according to an embodiment of this application. The data transmission apparatus 40 includes: a receiving module 41, configured to receive data sent by an anchor base station, where the data includes to-be-sent data that is to be sent to a terminal and identification information of the terminal; and a sending module 42, configured to send the to-be-sent data to the terminal.

In this solution, the identification information of the terminal includes a unique identifier used to indicate the terminal in an access-network notification area in which the terminal is located, or a C-RNTI, or an identifier allocated by a core-network device.

The data transmission apparatus provided in this embodiment is configured to perform a technical solution on a serving base station side in the data transmission method provided in any one of the foregoing method embodiments. An implementation principle and a technical effect thereof are similar. Details are not described herein again.

Figure 11:
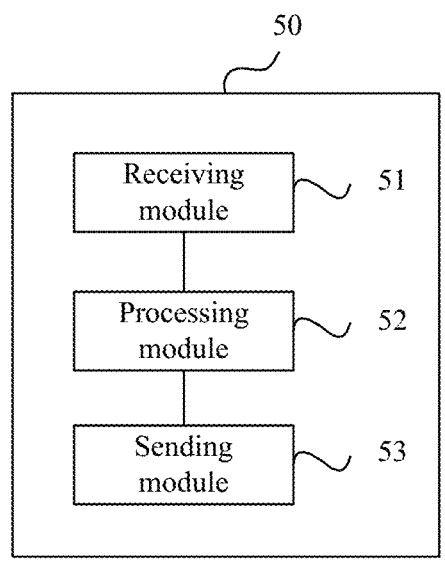
FIG. 11 is a schematic structural diagram of Embodiment 5 of a data transmission apparatus according to an embodiment of this application.

FIG. 11 is a schematic structural diagram of Embodiment 5 of a data transmission apparatus according to an embodiment of this application. The data transmission apparatus 50 includes: a receiving module 51, configured to receive data sent by a core-network device, where the data includes to-be-sent data that is to be sent to a terminal and identification information of the terminal; a processing module 52, configured to determine a serving base station of the terminal based on the identification information of the terminal; and a sending module 53, configured to send the data to the serving base station.

In this solution, the identification information of the terminal includes a unique identifier used to indicate the terminal in an access-network notification area in which the terminal is located, or a C-RNTI, or an identifier allocated by a core-network device.

The data transmission apparatus provided in this embodiment is configured to perform a technical solution on an anchor base station side in the data transmission method provided in any one of the foregoing method embodiments. An implementation principle and a technical effect thereof are similar. Details are not described herein again.

An embodiment of this application further provides a base station. The base station provides an air interface for a terminal, and the base station may interact with another base station. The base station is the serving base station in the foregoing solutions. The base station includes at least one processor, a memory, and a communications interface (for example, a receiver and a transmitter). The at least one processor, the memory, and the communications interface are connected to each other by using a bus. The memory stores a computer executable instruction. The at least one processor executes the computer executable instruction stored in the memory, so that the base station exchanges data with the another base station and a terminal through the communications interface, to perform a technical solution on a serving base station side in the data transmission method provided in any one of the foregoing embodiments. An implementation principle and a technical effect thereof are similar.

An embodiment of this application further provides a terminal. The terminal includes at least one processor, a memory, and a communications interface (for example, the terminal transmits data by using a receiver and a transmitter). The at least one processor, the memory, and the communications interface are connected to each other by using a bus. The memory stores a computer executable instruction. The at least one processor executes the computer executable instruction stored in the memory, so that the terminal exchanges data with a serving base station or an anchor base station through the communications interface, to perform a solution on a terminal side in the data transmission method provided in any one of the foregoing embodiments. An implementation principle and a technical effect thereof are similar.

An embodiment of this application further provides a base station. The base station may interact with another base station, and includes at least one processor, a memory, and a communications interface (for example, the base station transmits data by using a receiver and a transmitter). The at least one processor, the memory, and the communications interface are connected to each other by using a bus. The memory stores a computer executable instruction. The at least one processor executes the computer executable instruction stored in the memory, so that the base station exchanges data with the another base station or a terminal through the communications interface, to perform a technical solution on an anchor base station side in the data transmission method provided in any one of the foregoing embodiments. An implementation principle and a technical effect thereof are similar.

An embodiment of this application further provides a computer readable storage medium. The computer readable storage medium stores a computer executable instruction. When at least one processor of a base station executes the computer executable instruction, the base station performs a technical solution on a serving base station side in the data transmission method provided in the foregoing various implementations.

An embodiment of this application further provides a computer readable storage medium. The computer readable storage medium stores a computer executable instruction. When at least one processor of a terminal executes the computer executable instruction, the terminal performs the data transmission method provided in any one of the foregoing embodiments.

An embodiment of this application further provides a computer readable storage medium. The computer readable storage medium stores a computer executable instruction. When at least one processor of a base station executes the computer executable instruction, the base station performs a technical solution for an anchor base station in the data transmission method provided in any one of the foregoing embodiments.

An embodiment of this application further provides a computer program product. The computer program product includes a computer executable instruction. The computer executable instruction is stored in a computer readable storage medium. At least one processor of a base station may read the computer executable instruction from the computer readable storage medium, and the at least one processor executes the computer executable instruction, so that the base station implements a technical solution on a serving base station side in the data transmission method provided in the foregoing embodiments.

An embodiment of this application further provides a computer program product. The computer program product includes a computer executable instruction. The computer executable instruction is stored in a computer readable storage medium. At least one processor of a terminal may read the computer executable instruction from the computer readable storage medium, and the at least one processor executes the computer executable instruction, so that the terminal implements the data transmission method provided in the foregoing various implementations.

An embodiment of this application further provides a computer program product. The computer program product includes a computer executable instruction. The computer executable instruction is stored in a computer readable storage medium. At least one processor of a base station may read the computer executable instruction from the computer readable storage medium, and the at least one processor executes the computer executable instruction, so that the base station implements a technical solution on an anchor base station side in the data transmission method provided in the foregoing various implementations.

It should be understood that in the foregoing terminal or base station embodiments, the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the methods disclosed with reference to the embodiments of this application may be directly performed by a hardware processor, or may be performed by using a combination of hardware in a processor and a software module.

All or some of the steps in the foregoing method embodiments may be implemented by a program by instructing relevant hardware. The program may be stored in a computer readable memory. When the program is executed, the steps in the foregoing method embodiments are performed. The memory (storage medium) includes: a read-only memory (ROM), a RAM, a flash memory, a hard disk, a solid state disk, a magnetic tape, a floppy disk, an optical disc, and any combination thereof.

Finally, it should be noted that the foregoing embodiments are merely intended to describe the technical solutions of this application, but not to limit this application.

What is claimed is:

1. A device, wherein the device is a serving base station or the device is an apparatus included in the serving base station, the device comprising:
   at least one processor; and
   one or more memories storing programming instructions executable by the at least one processor to perform operations comprising:
   receiving, from a terminal, identification information of the terminal in an inactive state, wherein the identification information is allocated by an anchor base station of the terminal;
   determining the anchor base station of the terminal according to the identification information; and
   sending a cell radio network temporary identifier (C-RNTI) to the anchor base station, wherein the C-RNTI is allocated by the serving base station to the terminal.

2. The device according to claim 1, wherein the operations further comprise:
   receiving a logical channel identifier corresponding to to-be-sent data of the terminal; and
   sending, to the anchor base station, an IP flow identifier, the logical channel identifier, or a channel type corresponding to the to-be-sent data.

3. The device according to claim 1, wherein the identification information comprises:
   a unique identifier indicating the terminal in an access-network notification area in which the terminal is located.

4. The device according to claim 1, wherein the operations further comprise:
   before receiving the identification information, broadcasting configuration information, wherein the configuration information comprises: feedback configuration information, retransmission configuration information, physical layer parameter configuration information, non-scheduled transmission configuration information, media access control (MAC) layer control information, or channel configuration information;
   wherein the feedback configuration information or the retransmission configuration information comprises: a hybrid automatic repeat request (HARQ) process number, a retransmission redundancy version, an indication about whether to reset media access control (MAC), a physical downlink control channel (PDCCH) time-frequency resource used for feedback or downlink data sending, a timing relationship from uplink sending to downlink feedback, or a timing relationship from downlink sending to uplink feedback;
   wherein the physical layer parameter configuration information comprises: transmission time interval (TTI) duration, a cyclic prefix (CP) length, a subcarrier spacing, or a physical channel type;
   wherein the non-scheduled transmission configuration information comprises: a quantity of times of non-scheduled uplink blind retransmission, a non-scheduled automatic retransmission interval, non-scheduled transmission signal received power expected by a base station, a non-scheduled transmission power boost step, a demodulation reference signal (DRMS) list available for non-scheduled transmission, or a modulation and coding scheme (MCS) available for non-scheduled transmission;
   wherein the MAC layer control information comprises: whether to report channel state information (CSI), periodic or aperiodic CSI reporting, a CSI reporting class, whether to report a power headroom report (PHR), periodic or aperiodic PHR reporting, whether to report a buffer status report (BSR), a BSR reporting format, or periodic or aperiodic BSR reporting; and
   wherein the channel configuration information comprises: a radio link control (RLC) configuration corresponding to a service channel, a correspondence between a service channel and a flow identifier, or an RLC configuration corresponding to a control channel.

5. The device according to claim 1, wherein the operations further comprise:
receiving key update indication information from the terminal.

6. The device according to claim 1, wherein the operations further comprise:
establishing a media access control (MAC) entity or a radio link control (RLC) entity corresponding to the terminal; or
receiving configuration information or state information, from the anchor base station, of an RLC entity corresponding to the terminal.

7. The device according to claim 1, wherein:
the C-RNTI is allocated by the serving base station to the terminal during random access channel (RACH) data transmission; or
the C-RNTI is allocated by the serving base station to the terminal during radio access network notification area location update notification.

8. The device according to claim 1, wherein the operations further comprise:
sending an identifier of a cell that allocates the C-RNTI to the anchor base station, wherein the cell is of the serving base station.

9. The device according to claim 1, wherein the operations further comprises:
receiving data from the terminal; and
sending the data to the anchor base station.

10. A device, wherein the device is an anchor base station of a terminal, or the device is an apparatus included in the anchor base station of the terminal, the device comprising:
at least one processor; and
one or more memories storing programming instructions executable by the at least one processor to perform operations comprising:
allocating, to the terminal, identification information of the terminal for the terminal to use in an inactive state;
receiving a cell radio network temporary identifier (C-RNTI) from a serving base station of the terminal, wherein the C-RNTI is allocated by the serving base station of the terminal to the terminal; and
updating a context of the terminal in the anchor base station according to the C-RNTI.

11. The device according to claim 10, wherein the operations further comprise:
receiving an IP flow identifier, a logical channel identifier, or a channel type corresponding to to-be-sent data of the terminal that is sent by the serving base station.

12. The device according to claim 10, wherein the operations further comprise:
receiving a terminal identity deletion instruction from the serving base station; and
deleting the identification information of the terminal according to the terminal identity deletion instruction.

13. The device according to claim 10, wherein the operations further comprise:
sending configuration information to the terminal, wherein the configuration information comprises: feedback configuration information, retransmission configuration information, physical layer parameter configuration information, non-scheduled transmission configuration information, media access control (MAC) layer control information, or channel configuration information;

wherein the feedback configuration information or the retransmission configuration information comprises: a hybrid automatic repeat request (HARQ) process number, a retransmission redundancy version, an indication about whether to reset media access control (MAC), a physical downlink control channel (PDCCH) time-frequency resource used for feedback or downlink data sending, a timing relationship from uplink sending to downlink feedback, or a timing relationship from downlink sending to uplink feedback;
wherein the physical layer parameter configuration information comprises: transmission time interval (TTI) duration, a cyclic prefix (CP) length, a subcarrier spacing, or a physical channel type;
wherein the non-scheduled transmission configuration information comprises: a quantity of times of non-scheduled uplink blind retransmission, a non-scheduled automatic retransmission interval, non-scheduled transmission signal received power expected by a base station, a non-scheduled transmission power boost step, a demodulation reference signal (DRMS) list available for non-scheduled transmission, or a modulation and coding scheme (MCS) available for non-scheduled transmission;
wherein the MAC layer control information comprises: whether to report channel state information (CSI), periodic or aperiodic CSI reporting, a CSI reporting class, whether to report a power headroom report (PHR), periodic or aperiodic PHR reporting, whether to report a buffer status report (BSR), a BSR reporting format, or periodic or aperiodic BSR reporting; and
wherein the channel configuration information comprises: a radio link control (RLC) configuration corresponding to a service channel, a correspondence between a service channel and a flow identifier, or an RLC configuration corresponding to a control channel.

14. The device according to claim 10, wherein the operations further comprise:
receiving, from the serving base station, an identifier of a cell that allocates the C-RNTI, wherein the cell is of the serving base station.

15. The device according to claim 10, wherein the operations further comprise:
receiving data of the terminal from the serving base station.

16. A communication system, comprising:
a serving base station; and
an anchor base station;
wherein the serving base station is configured to:
receive, from a terminal in an inactive state, identification information of the terminal in the inactive state;
determine the anchor base station according to the identification information; and
send a cell radio network temporary identifier (C-RNTI) to the anchor base station, wherein the C-RNTI is allocated by the serving base station to the terminal; and
wherein the anchor base station is configured to:
allocate the identification information to the terminal;
receive the C-RNTI from the serving base station; and
update a context of the terminal in the anchor base station according to the C-RNTI.

17. The system according to claim 16, wherein the identification information comprises:
- a unique identifier indicating the terminal in an access-network notification area in which the terminal is located.

18. The system according to claim 16, wherein:
- the C-RNTI is allocated by the serving base station to the terminal during random access channel (RACH) data transmission; or
- the C-RNTI is allocated by the serving base station to the terminal during radio access network notification area location update notification.

19. The system according to claim 16, wherein the serving base station is further configured to:
- send an identifier of a cell that allocates the C-RNTI to the anchor base station, wherein the cell is of the serving base station; and wherein the anchor base station is further configured to:
- receive the identifier of the cell from the serving base station.

20. The system according to claim 16, wherein the serving base station is further configured to:
- receive data from the terminal; and
- send the data to the anchor base station.

* * * * *